United States Patent [19]

Yokota et al.

[11] 4,379,286
[45] Apr. 5, 1983

[54] DIGITAL SIGNAL PROCESSING CIRCUIT

[75] Inventors: Teppei Yokota, Chiba; Yoshiro Joichi, Tokyo, both of Japan

[73] Assignee: Sony Corporation, Tokyo, Japan

[21] Appl. No.: 285,840

[22] Filed: Jul. 22, 1981

[30] Foreign Application Priority Data

Jul. 28, 1980 [JP] Japan ................................ 55-103320

[51] Int. Cl.³ ............................................. H03K 13/02
[52] U.S. Cl. ................................ 340/347 DD; 371/37
[58] Field of Search ...................... 360/32, 48; 371/38, 371/37; 340/347 DD

[56] References Cited

U.S. PATENT DOCUMENTS 3,274,378 9/1966 Crawford .................... 340/347 DD
3,631,471 12/1971 Griffiths ...................... 340/347 DD Primary Examiner—C. D. Miller
Attorney, Agent, or Firm—Hill, Van Santen, Steadman, Chiara & Simpson

[57] ABSTRACT

Disclosed is a digital signal processing circuit, which can process digital data of at least two different data formats where one word consists of respectively of m and n bits (m and n being positive integers and m>n), for instance 16 and 14 bits, resides in that serial data of the data format where one word consists of m bits (for instance 16 bits) is rearranged into a form conforming to the data format where one word consists of n bits (for instance 14 bits) and that processing (for instance T matrix calculation) is effected according to a bit clock corresponding to the difference in the bit number between m and n, thereby obtaining data conforming to the data format where one word consists of n bits.

2 Claims, 5 Drawing Figures

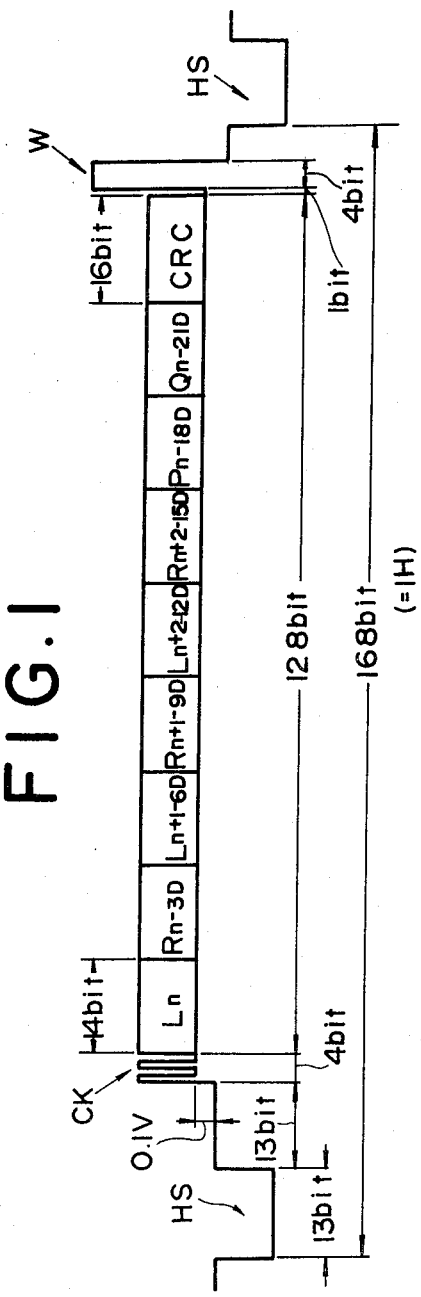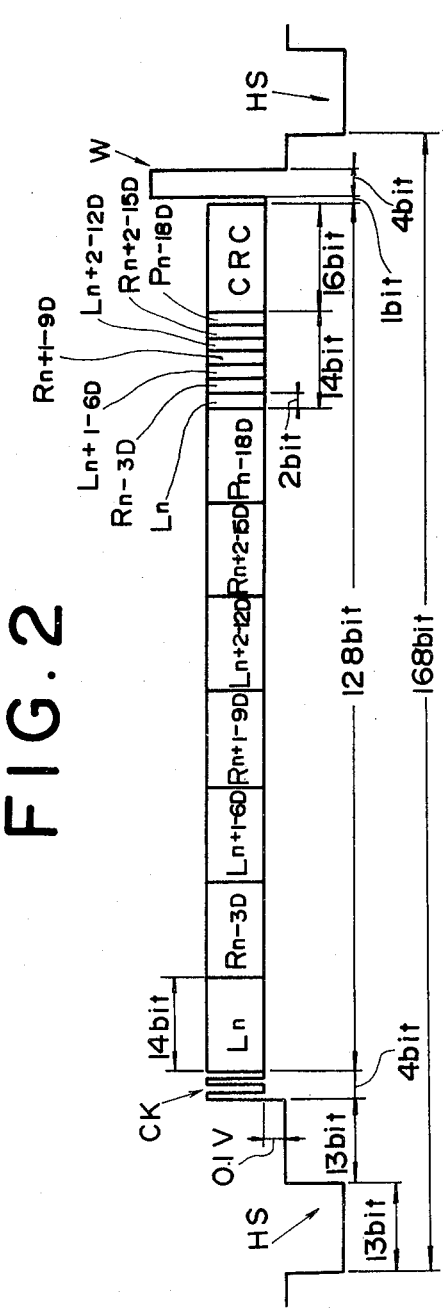

DIGITAL SIGNAL PROCESSING CIRCUIT

BACKGROUND OF THE INVENTION

1. Field of the Invention

This invention relates to digital processing circuits and, more particularly, to digital processing circuits which can handle data of at least two different formats where one word consists respectively of different numbers of bits.

2. Description of the Prior Art

When recording and reproducing an audio signal such as that of music in the PCM (Pulse Coded Modulation) form using an ordinary home video tape recorder, it is necessary to convert the PCM signal into a signal of a data format conforming to the signal of the standard NTSC television system.

As an example of the PCM modulation, it has been known to sample, for instance, two-channel stereo audio signal at a sampling frequency of about 44 kHz for each of the left and right channels, convert the sampled data into a PCM digital data where one sampled data (i.e., one word) consists of 16 or 14 bits, for instance, and place this PCM digital data in the position of the video signal in the standard television signal.

Since the format where one word consists of 16 bits and the format where one word consists of 14 bits are conceivable, it is desired to provide a processing circuit having the compatibility with respect to both the formats and also with the capability of encoding the sampled analog audio signal into a format where one word (one sampling data) consists of 16 bits and processing the 16-bit words as such or after conversion into 14-bit words.

SUMMARY OF THE INVENTION

An object of the present invention is to provide a digital signal processing circuit, which can process data of a plurality of different data formats where one word consists respectively of different numbers of bits.

Another object of the present invention is to provide a digital signal processing circuit, which can process audio signals as digital data of at least two different data formats such as a first data format, in which one word consists of 14 bits and two error correction words P and Q are provided, and a second data format, in which one word consists of 16 bits and a single error correction word P is provided.

In accordance with one aspect of the present invention, in a digital signal processing circuit, which can process digital data of at least two different data formats where one word consists respectively of m and n bits (with m and n being positive integers and m>n), the serial data of the data format where one word consists of m bits rearranged into a form conforming to the data format where one word consists of n bits, and the rearranged data is processed according to a bit clock corresponding to the difference in the bit number between m and n, thereby obtaining data conforming to the data format where one word consists of n bits.

The above and other objects, features and advantages of the present invention will become readily apparent from the ensuing detailed description of the illustrative embodiments of the present invention which is to be read in connection with the accompanying drawings.

BRIEF DESCRIPTION OF THE DRAWINGS

FIGS. 1 and 2 are views showing data formats for recording and reproducing a PCM audio signal, constituting a time chart showing data format examples where one word consists respectively of different numbers of bits;

DETAILED DESCRIPTION OF THE PREFERRED EMBODIMENT

Figure 3:
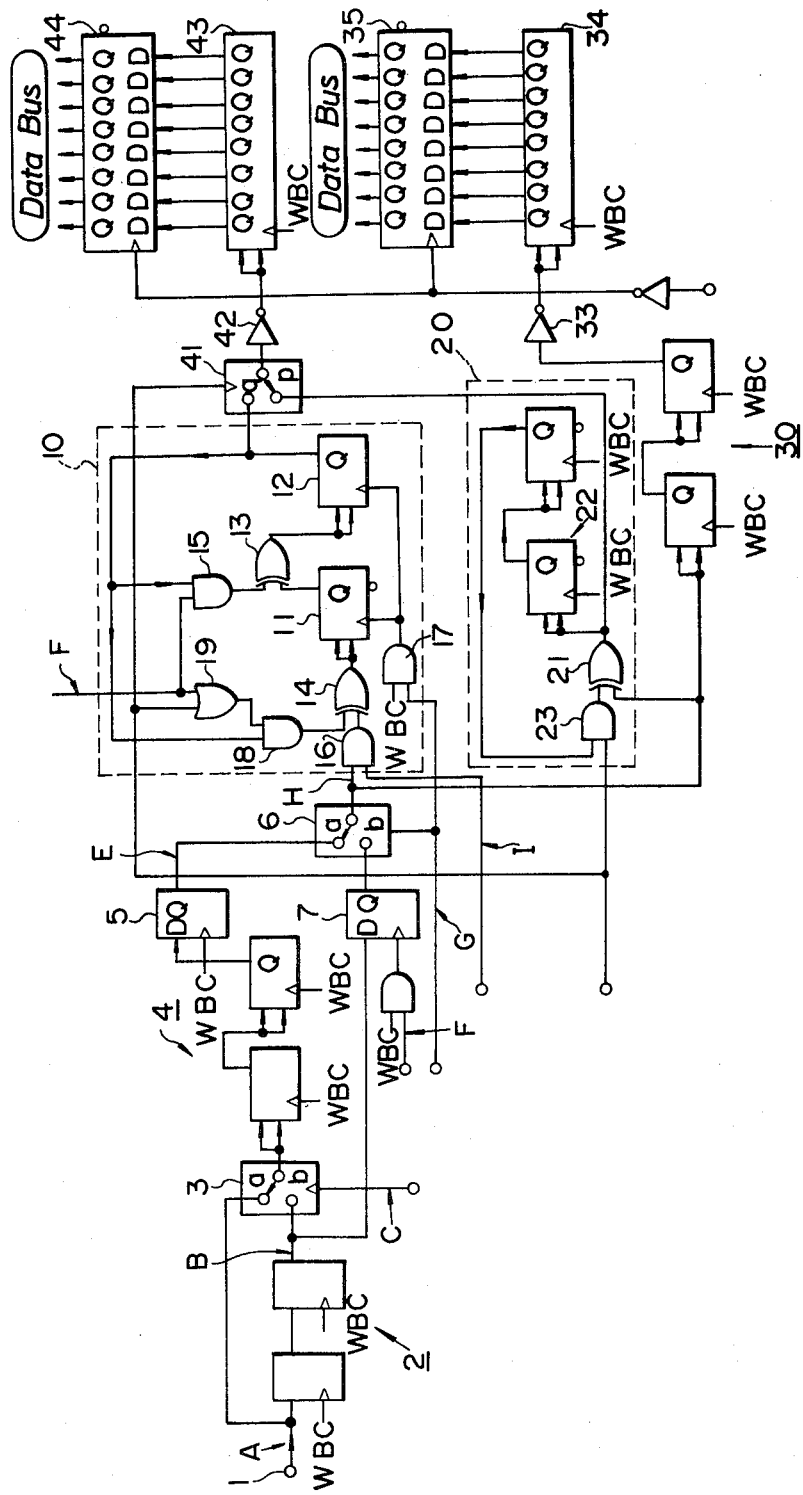
FIG. 3 is a schematic representation of one embodiment of the present invention.

Prior to describing the preferred embodiment of the present invention, the data format of a PCM audio signal, which has a signal pattern resembling a standard television signal and is capable of being recorded and reproduced with a usual video tape recorder, will first be described. FIG. 1 shows an example of the data format for one horizontal scanning period (1-H period) in a case when one word consists of 14 bits. In the data block for the 1-H period shown in FIG. 1, six words of PCM signal for the left and right channels alternately arranged, two correction words P and Q and one 16-bit error detection word CRC constitute a 9-word 128-bit data block. In the PCM data shown in FIG. 1, L and R represent the left and right channel sampled data respectively, and the suffixes attached represent the order of sampling. In the format of FIG. 1, the data is interleaved such that the six words and two error correction words P and Q, i.e., a total of eight words, in each sampled data are successively shifted by 16 blocks (i.e., for 16-H period) for each word, and D in the suffix symbols mentioned above represents the number of blocks (D=16) of the interleave. In this case, the interleave of D=16 blocks is equivalent to a word interleave of 3 D=48 words.

Further, in FIG. 1, the 1-H period is constituted of 168 bits. In this 168-bit interval, the horizontal sync signal HS which has a pulse width of 13 bits is placed in the leading end position, then a 4-bit clock signal CK for synchronization of data and then the aforementioned 128-bit data block. Here, the data synchronization signal CK has a code of, for instance, "1010". After the 128-bit data block, a one-bit "0" signal and then a white reference signal W having a pulse width of four bits are placed.

FIG. 2 shows an example of the data block where one word of the aforementioned PCM audio signal is constituted by 16 bits. Here, an 8-word 128-bit data block is constituted by six 16-bit words of the left and right channel audio signal data L and R, a 16-bit error correction word P and a 16-bit error detection word CRC, i.e., a total of eight words. In this format, the error correction word Q is omitted, and only a single error correction word P is used. In this case, in order to provide for the compatibility with respect to the aforementioned 14-bit data format, it is desirable to subdivide the 16-bit data for one word into, for instance, a 14-bit portion and a 2-bit portion and thereby retain a 14-bit unit pattern. In the format of FIG. 2, for instance, the 14-bit portions of the respective seven words, namely the six audio signal data words L and R and one error correction word P, are placed in the same position as the individual corresponding words in FIG. 1, and the remaining 2-bit portions of these seven words are then arranged in the same order as 14-bit data in the position of the error correction word Q in FIG. 1. The other signal components in the 1-H period such as the horizontal sync signal HS and white reference signal W are in the same arrangement as in the format of FIG. 1.

In order to provide the compatibility for the format where one word consists of 14 bits and the format where one word consists of 16 bits, it is desired to provide the circuit with the compatibility and also permit one sampled data of analog audio signal to be encoded in 16 bits and converted into a 14-bit word through processing in the circuit.

To meet the above requirements, the present invention provides a digital signal processing circuit, which can process data of a first format, in which one word consists of 14 bits and two error correction words P and Q are provided, and a second data format in which one word consists of 16 bits and a single error correction word P is provided with a common circuit construction.

Now, a preferred embodiment of the present invention will be described with reference to the drawings.

Figure 4:
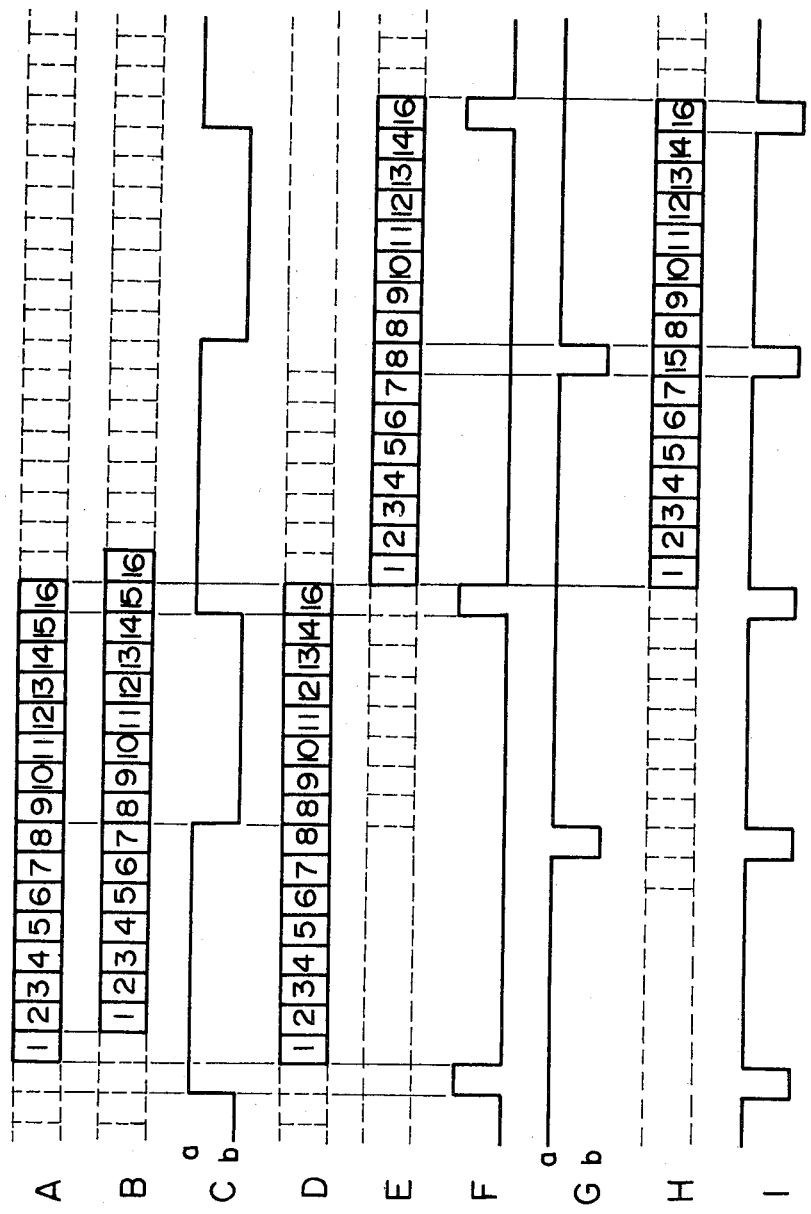
FIGS. 4A to 4I form a time chart illustrating the output signals or data at various points A to I in the circuit of FIG. 3.

FIG. 3 is a block diagram showing an embodiment of the present invention. In FIG. 3, the aforementioned PCM audio signal data where one word consists of 16 bits is supplied as a serial data consisting of alternate left and right channel data to a data input terminal 1. In FIG. 4A, a one-word (i.e., 16-bit) portion of the input serial data is shown by solid lines, while the rest is shown by dashed lines. This input data is delayed by a one-bit delay circuit 2 using two D type flip-flops, thus providing data of a timing as shown in FIG. 4B. In FIG. 4, the numerals in the individual sixteen bits for one word represent the bit order numbers. A clock signal WBC shown in FIG. 3 is a word bit clock signal in which one pulse corresponds to one bit.

The input data (FIG. 4A) and one-bit delayed data (FIG. 4B) are supplied to respective select terminals a and b of a select switch 3. The select switch 3 is switched under the control of a switching signal, for instance as shown in FIG. 4C, that is, it is switched to the side of the terminal at the instant corresponding to the position between the 15-th and 16-th bits of the input data (FIG. 4A) and switched to the side of the terminal b at the instant corresponding to the position between the 8-th and 9-th bits. As shown in FIG. 4D, the output data from the switch 3 contains the data of FIG. 4A for the 1-st to 8-th bits, the data of FIG. 4B for the 9-th to 15-th bits, and the data of FIG. 4A for the 16-th bit. Thus, the content of the 16-bit word as the output of the switch 3 is given in terms of the bit order numbers of the original input data as "1,2,3,4,5,6,7,8,8,9,10,11,12,13,14,16".

The data of FIG. 4C, in which the data for the 9-th to 15-th bits are delayed by one bit, is coupled through a 16-bit delay circuit 4 including two series 8-bit registers and a D type flip-flop 5 to obtain a delayed 16-bit data as shown in FIG. 4E which is coupled to a select terminal a of a select switch 6. To a select terminal b of the select switch 6 is supplied the Q output of a latch circuit 7 using a D type flip-flop. The latch circuit 7 latches data of the 15-th bit in the aforementioned one-bit delayed data (FIG. 4B) under the control of a latch pulse as shown in FIG. 4F, and the latched data is supplied to the select terminal of the select switch 6. The switching of the select switch 6 is controlled by a switching signal as shown in FIG. 4G, that is, a signal by which the switch 6 is switched to the side of its select terminal b only for the 8-th bit of the aforementioned delayed 16-bit data (FIG. 4E). Thus, the output data from the select switch 6 is as shown in FIG. 4H, in which the 8-th bit is replaced with the 15-bit of the aforementioned input data, that is, the one-word content of the original input data are arranged as "1,2,3,4,5,6,7,15,8,9,10,11,12,13,14,16" in terms of the bit order numbers.

With this rearranged one-word 16-bit data, by taking out only the 7-bit portion of each of the 8-bit halves of the one-word 16-bit data, 14-bit data can be readily obtained, that is, the rearranged one-word 16-bit data can be readily converted into the 14-bit data.

This rearranged data of FIG. 4H is supplied to a Q generation circuit section 10, a P generation circuit section 20 and a 16-bit delay circuit section 30.

The generation of the error correction word P in the P generation circuit section 20 takes place as a digital addition of 6-word data of the left and right channels for each bit order number with 2 as modulus. For example, the error correction word $P_n$ is expressed as $$P_n = L_n \oplus R_n \oplus L_{n+1} \oplus R_{n+1} \oplus L_{n+2} \oplus R_{n+2} \cdots \quad (1)$$

In the equation (1), n represents the aforementioned order of sampling and is 0 or an integral multiple of 3. The symbol $\oplus$ represents mod 2 addition (i.e., digital addition with 2 as modulus) for each bit of each word.

Thus, the P generating circuit section 20 may have a simple construction as shown in FIG. 3, including an exclusive OR circuit (hereinafter referred to as Ex.OR circuit) for effecting the mod 2 addition and a 16-bit delay circuit 22 having two 8-bit shift registers. More particularly, the output data from the select switch 6 (FIG. 4H) is supplied to the Ex.OR circuit 21, and the output therefrom is delayed through the 16-bit delay circuit 22, the output of which is in turn fed back through an AND circuit 23 to the Ex.OR circuit 21. To the AND circuit 23, a switching signal for switching the P and Q outputs of a select switch 41 which will be described later. The output of the Ex.OR circuit 21 is also supplied to the select terminal p of the select switch 41.

The 16-bit delay circuit section 30 may be constructed by connecting two 8-bit shift registers in series, and the output data from the select switch 6 (FIG. 4H) is further delayed by 16 bits before being supplied to an inverter 33. The output of the inverter 33 is supplied through a serial-input parallel-output type 8-bit shift register 34, and is supplied as 8-bit parallel data through an input latch circuit 35 to a data bus.

The generation of the error correction word $Q_n$ in the Q generation circuit section 10 is effected through calculation according to an equation $$Q_n = T^6 L_n \oplus T^5 R_n \oplus T^4 L_{n+1} \oplus T^3 R_{n+1} \oplus T^2 L_{n+2} \oplus T R_{n+2} \cdots \quad (2)$$

In the equation (2), T is expressed as $$T = \begin{pmatrix} 0000000000001 \\ 1000000000000 \\ 0100000000000 \\ 0010000000000 \\ 0001000000000 \\ 0000100000000 \\ 0000010000000 \\ 0000001000000 \\ 0000000100001 \\ 0000000010000 \\ 0000000001000 \\ 0000000000100 \\ 0000000000010 \end{pmatrix} \quad (3)$$

This T matrix is an auxiliary matrix of a polynominal $$1+x^8+X^{14}\ldots \quad (4)$$

Thus, the matrix calculation according to the equation (2) can be obtained using shift registers connected in the form of the equation (4).

Figure 5:
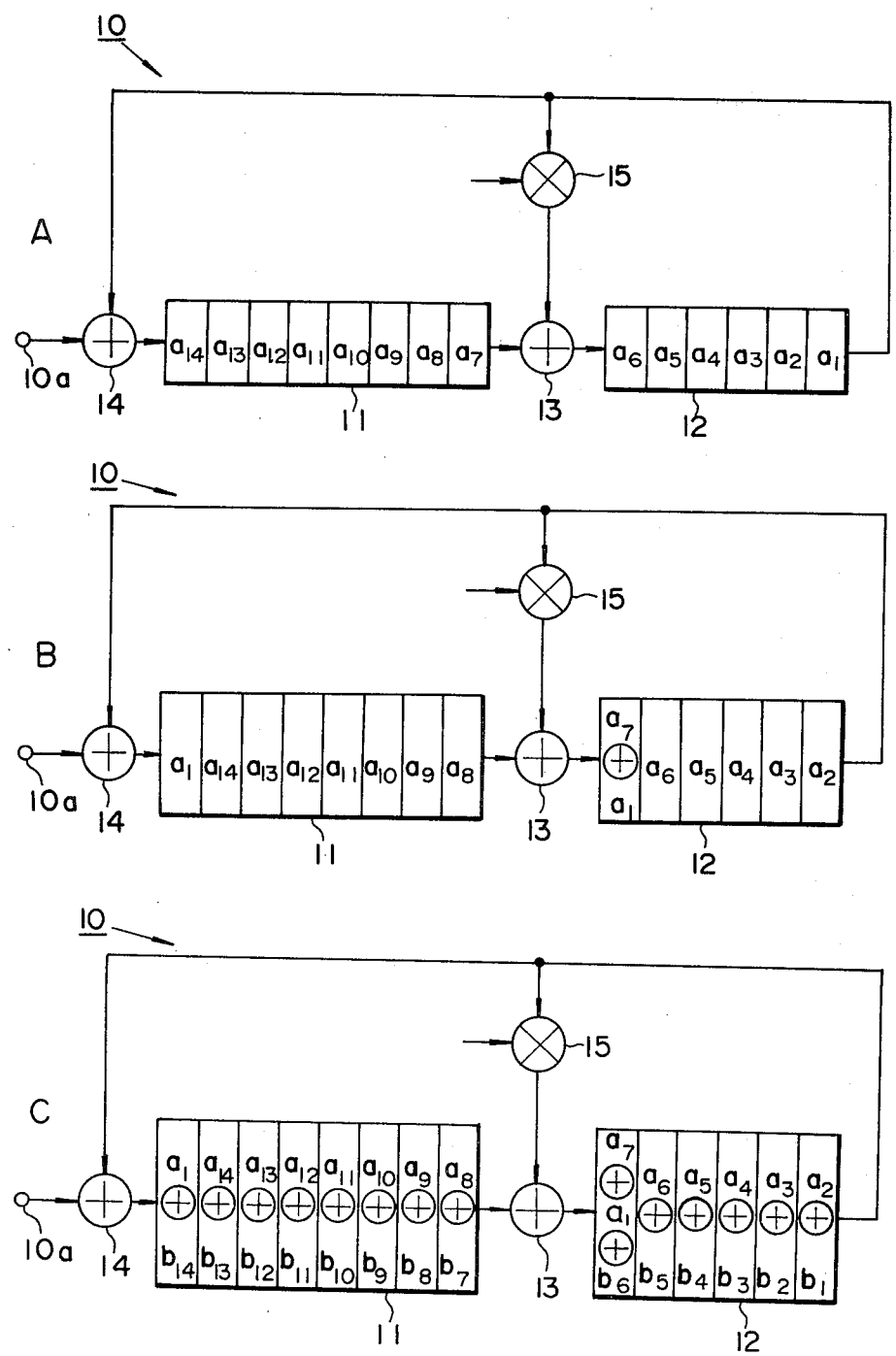
FIGS. 5A to 5C are block diagrams illustrating the calculation of error correction word Q.

FIG. 5 shows the construction with which to perform the aforementioned matrix calculation. Here, an 8-bit shift register 11 and a 6-bit shift register 12 are connected in series via a digital adder 13 for effecting the mod 2 addition such as an Ex.OR circuit. The data where one word consists of 14 bits is serially coupled to an input terminal 10a, and is supplied through the digital adder 14 using an Ex.OR circuit or the like to the input terminal of the 8-bit shift register 11. The output of the 6-bit shift register 12 is supplied to the input side digital adder 14 for effecting successive mod 2 addition with the aforementioned serial input data. The output from the 6-bit shift register 12 is supplied through a gate circuit 15 to an intermediate digital adder 13 for successive mod 2 addition with the output of the 8-bit shift register 11.

For performing the calculation of $Q_n$ in the equation (2), $L_n, R_n$, etc. are successively coupled to the input terminal 10a. At this time, it is necessary to provide open the gate circuit 15 for a shift every time the data for one word is supplied.

To this end, the shift registers 11 and 12 are cleared to supply 14-bit data of $L_n$ of the first word (these data being successively denoted by $a_1, a_2, \ldots, a_{14}$) to the input terminal 10a. At this time, the gate circuit 15 remains closed, and the digital adder 13 supplies the output data from the 8-bit shift register 11 directly to the 6-bit shift register 12. Thus, when the coupling of the 14-bit data of $L_n$ of one word is ended, the shift registers 11 and 12 are in their states as shown in FIG. 5A.

Then, the gate circuit 15 is opened to cause a shift for one bit in the shift registers 11 and 12. As a result, the content $TL_n$ of the shift registers 11 and 12 is as shown in FIG. 5B.

Then, the gate circuit 15 is closed gain, and the 14-bit data of $R_n$ of the second word (these data being successively denoted by $b_1, b_2, \ldots, b_{14}$). As a result, the content of the shift registers 11 and 12 shown in FIG. 5B and the content of the input data are digitally added together as the mod 2 addition in the digital adder 14, and the content $R_n \oplus TR_n$ of the shift registers 11 and 12 as shown in FIG. 5C is obtained.

Then, the gate circuit 15 is opened to cause shift for one bit, whereby the T matrix calculation is made with respect to the content of the shift registers 11 and 12 to obtain $T(R_n) \oplus TL_n = TR_n \oplus T^2 L_n$ as the shift register content. In this way, T is successively calculated every time one word data is coupled up to $R_{n+2}$. Thus, the error correction word $Q_n$ in the equation (2) is obtained as the content of the shift register 11 and 12.

In the above processing, a shift for one bit is necessary after the successive coupling of the 14-bit data of one word to the input terminal 10a. Otherwise, the continuous serial input signal cannot be handled due to the generation of a point of discontinuity. According to the present invention, use is made of a bit corresponding to the difference between 16 bits and 14 bits, and the calculation of the T matrix is carried out with the aforementioned one-bit shift effected with the timing of the 16-th bit (the content of which is also "16") in the rearranged data of FIG. 4H.

More particularly, the Q generation circuit section 10 of FIG. 3, in which like parts as those in FIG. 5 are designated by like reference numerals, includes the 8-bit shift register 11, 6-bit shift register 12, Ex.OR circuits 13 and 14 for effecting the mod 2 addition and gate AND circuit 15 for the gate control. Further, an AND circuit 16 for removing the 8-th and 16-th bits from the output data (FIG. 4H) of the select switch circuit, is connected to one input terminal of the OR circuit 14, and a gate control signal as shown in FIG. 4I, which is "L" for the 8-th and 16-th bits, is supplied to the AND circuit 16. Further, the WBC signal is supplied through an AND circuit 17 to the clock terminal of the shift registers 11 and 12 while supplying a gate control signal which is "L" only for the 8-th bit as shown in FIG. 4G to the other input terminal of the AND circuit 17, thus inhibiting the shift operation for the 8-th bit. To the AND circuit 15 which serves as a gate circuit as mentioned above, the output of the 6-bit shift register 12 and a gate control signal which is "H" only for the 16-th bit as shown in FIG. 4F are supplied. The output of the 6-bit shift register 12 is supplied through an AND circuit 18 to the input side Ex.OR circuit 14. To the other input terminal of the AND circuit 18 is supplied a signal obtained by ORing the gate control signal of FIG. 4F and the P/Q signal to the select switch 41 mentioned above through an OR circuit 19.

In the Q generation circuit section 10 of the above construction, with the data shown in FIG. 4H supplied through the AND circuit 16 the 8-th bit of the content "15" and the 16-th bit of the content "16" are removed, and thus a continuous 14-bit data "1,2, ... ,14" is coupled to the shift registers 11 and 12. For the 16-th bit, no data is provided, and only the clock pulse from the AND circuit 17 is supplied. Thus, the AND gates 15 and 18 which serve as gates at this time are opened to permit the aforementioned T matrix calculation. When the data of the next word is supplied, the 14-bit portion is supplied through the AND circuit 16 to the Ex.OR circuit 14 for the mod 2 addition for each of the 14 bits, and the results are coupled to the shift registers 11 and 12. In this way, the mode 2 addition for 14 bits and T matrix calculation are successively effected for every WBC for 16 bits, and thus the 16-bit serial data signal can be continuously coupled and processed.

After the calculation according to the equation (2) mentioned above is made with data for six words, the output of the shift registers 11 and 12 for the error correction word Q is supplied to a select terminal q of a select switch 41. At this time, the select switch 41 is has been set on the side of the terminal q, and the output of the select switch 41 is inverted through an inverter 42 to a serial-input parallel-output type 8-bit shift register 43. The 8-bit parallel data from the 8-bit shift register 43 is supplied through an input latch circuit 44 to the data bus. The select switch 41 is set on the side of its terminal p at all time other than when providing the aforementioned error correction word Q, and the output of the P generation circuit section 20 is supplied after inversion through an inverter 42 to the 8-bit shift register 43.

The 8-bit parallel data from the input latch circuits 34 and 43 are coupled through the data bus to a memory or the like for writing therein, and by subsequently taking out only the upper seven bits twice in succession the 14-bit data is obtained while the 16-bit data is obtained by taking out all the eight bits twice in succession.

As has been described in the foregoing, the feature of the digital signal processing circuit according to the present invention, which can process digital data of at least two different data formats where one word consists respectively of m and n bits (m and n being positive integers and m>n), for instance 16 and 14 bits, resides in that the serial data of the data format where one word consists of m bits (for instance 16 bits) is rearranged to a form conforming to the data format where one word consists of n bits (for instance 14 bits) and that processing (for instance T matrix calculation) is effected according to a bit clock corresponding to the difference in the bit number between m and n, thereby obtaining data conforming to the data format where one word consists of n bits.

The rearrangement of data mentioned above is effected by placing the upper 14 bits of the data where one word consists of 16 bits in the upper 7 bits of the 8-bit halves of the 16-bit data, and through such rearrangement of data the conversion of the data where one word consists of 16 bits into the data where one word consists of 14 bits.

Further, while hitherto it has been impossible to handle a continuous input signal because the matrix calculation using a shift register such as that for the error correction word Q which is required in the data format of the aforementioned PCM audio signal where one word consists of 14 bits involves a discontinuous operation such as a shift of data for one bit without input of any data, according to the invention the difference between 16 bits of one word and 14 bits is used to cope with the aforementioned discontinuous operation, it is possible to continuously couple and process serial data where one word consists of 16 bits. Thus, both data of the data format where one word consists of 16 bits and data of the data format where one word consists of 14 bits can be processed with the same circuit construction.

The above embodiment of the present invention is by no means limitative, and various changes and modifications can be made without departing from the scope and spirit of the invention.

What is claimed is:

1. A digital signal processing circuit, in which first and second error correction words are generated from a predetermined number of words among data consisting of a plurality of words each consisting of n bits and which can process digital data of a data format where at least said predetermined number of words and said first and second error correction words constitute one block, comprising an input terminal 1 to which said plurality of n-bit data words are supplied, a first error correction word generating circuit 20 for generating said first error correction word from said predetermined number of data words, a second error correction word generating circuit 10 for generating said second error correction word, and a timing signal generating circuit for generating a timing signal for controlling said first and second error correction word generating circuits, a plurality of data words each consisting of m bits (m being a positive integer greater than n) being supplied to said input terminal 1, said second error correction word generating circuit 10 effecting operations necessary for generating said second error correction word with at least one clock signal among a bit clock of m-n bits and controlled by a timing pulse output from said timing signal generating circuit.

2. The digital signal processing circuit according to claim 2, wherein said second error correction word generating circuit consists of an exclusive or gate of values obtained by multiplying the individual words of said predetermined number of words by different generating matrices, and wherein said second error correction word generating circuit 10 includes a cyclic redundancy code generating circuit, said cyclic redundancy code generating circuit completing one operation cycle at least with one clock signal among said bit clocks of m-n bit.

* * * * *